United States Patent [19]
White et al.

[11] Patent Number: 5,299,771
[45] Date of Patent: Apr. 5, 1994

[54] VERTICAL SEAT POSITION ADJUSTER

[75] Inventors: Mark D. White, Bracebridge; Bartholomew J. Boelryk, Waubaushene; Roger Freund, Bracebridge, all of Canada

[73] Assignee: Rockwell International Corporation, Pittsburgh, Pa.

[21] Appl. No.: 83,410

[22] Filed: Jun. 28, 1993

Related U.S. Application Data

[63] Continuation of Ser. No. 755,278, Sep. 5, 1991, Pat. No. 5,222,710.

[51] Int. Cl.$^5$ .......................................... F16M 11/00
[52] U.S. Cl. ................................. 248/422; 248/405
[58] Field of Search ............ 248/405, 419, 429, 430, 248/157, 422, 396; 297/348, 338, 339

[56] References Cited

U.S. PATENT DOCUMENTS

| | | | |
|---|---|---|---|
| 1,694,243 | 12/1928 | Wilford | 248/405 X |
| 3,182,947 | 5/1965 | Tanaka | 248/396 X |
| 3,194,530 | 7/1965 | Heyl, Jr. | 248/419 |
| 4,257,569 | 3/1981 | Budinski | 248/396 X |
| 4,333,627 | 6/1982 | Dembinski | 248/396 |
| 4,509,382 | 4/1985 | Colautti et al. | 248/405 X |
| 4,645,159 | 2/1987 | Terada et al. | 248/429 |
| 4,721,337 | 1/1988 | Tomita | 248/429 X |
| 4,889,379 | 12/1989 | Aso | 248/430 X |
| 5,048,786 | 9/1991 | Tanaka et al. | 248/429 |
| 5,094,420 | 3/1992 | Aihara et al. | 248/419 X |
| 5,150,872 | 9/1992 | Isomura | 248/430 X |
| 5,172,601 | 12/1992 | Siegrist et al. | 248/429 X |

FOREIGN PATENT DOCUMENTS

| | | | |
|---|---|---|---|
| 534047 | 12/1956 | Canada | 248/405 |
| 2032881 | 5/1980 | United Kingdom | 248/396 |

*Primary Examiner*—Karen J. Chotkowski

[57] ABSTRACT

A mechanism used to control the vertical height as well as fore-aft position of a vehicle seat while presenting a minimum height profile when adjusted to minimum vertical elevation. The seat is connected to a pair of rails, one stationary and one reciprocable. A seat is affixed to an attachment bracket which is connected to the reciprocable rail by a vertical height adjuster comprising a vertically oriented screw jack which may be positioned to selectable heights by a motor. The fore-aft relationship of the rails may also be selectively adjusted by a motor driving a horizontally oriented screw jack. Both screw jacks incorporate a screw connected to a helical gear engaged to a worm gear. The worm gear is driven by a remote motor through a flexible drive cable. Both screw jacks present a structure which offers a minimum height profile when the seat is positioned at minimum vertical height. In this manner, an aerodynamically efficient roof line may be utilized while providing maximum head room for the vehicle occupants.

1 Claim, 4 Drawing Sheets

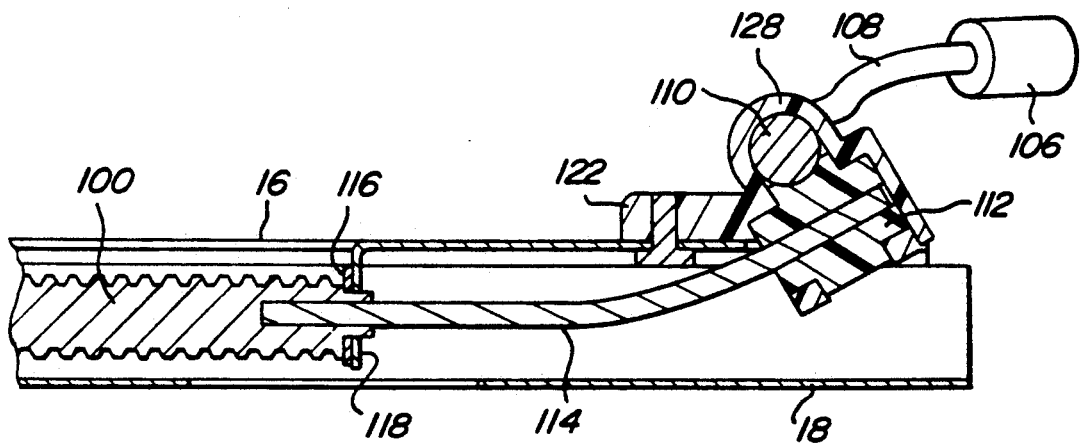
Fig-5
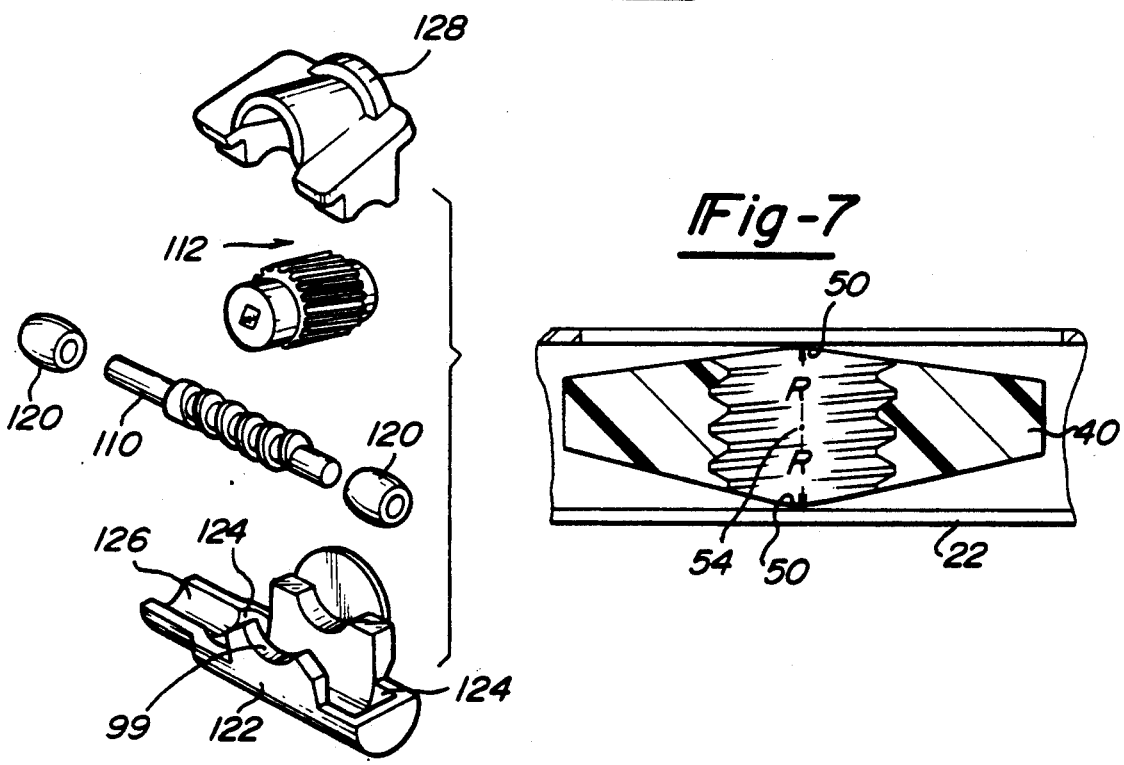
Fig-7
Fig-6
Fig-8
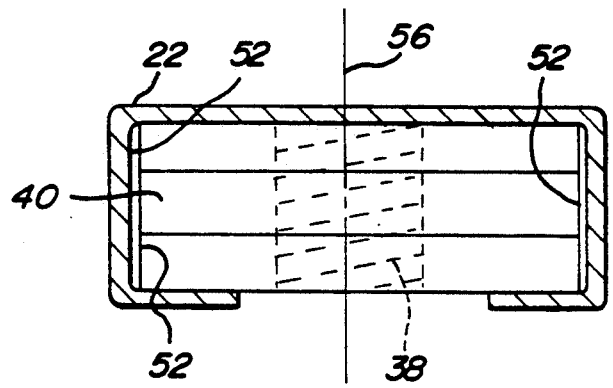

VERTICAL SEAT POSITION ADJUSTER

This is a continuation of copending application Ser. No. 07/755,278 filed on Sep. 5, 1991, now U.S. Pat. No. 5,222,710.

BACKGROUND OF THE INVENTION

1. Field of the Invention

The present invention relates generally to seat adjusters of the type commonly used in motor vehicles and, more particularly, to a low profile seat adjuster providing vertical as well as fore-aft adjustment.

2. Description of Related Art

The automotive vehicle designer seeks to achieve an aerodynamic profile to satisfy fuel consumption goals as well as to provide an aesthetically appealing appearance. A low roof line is essential to achieving an aerodynamic profile. A vehicle having a low roof line must also provide adequate head room for a vehicle occupant. Therefore, a low vertical profile seat must be utilized. The vertical profile of a seat is dictated by the height of the mechanism which provides vertical as well as fore-aft positional adjustment. Conventional technology such as described in U.S. Pat. Nos. Tanaka 3,182,947 and Colautti, et al. 4,509,382 feature telescoping devices which include telescoping segments, which present an objectionably tall profile when adjusted to minimum vertical height position.

An additional problem encountered in seeking a seat design offering a minimum vertical profile is presented by mechanisms seeking to achieve fore-aft positioning of a vehicle seat. Such mechanisms present an overall height which is an accumulation of the individual heights of the transmission and the tracks. For example, in Aihara, et al. U.S. Pat. No. 4,805,866, the transmission is located above and coaxial with the tracks. Therefore, the minimum profile defined by a seat adjusted to minimum vertical elevation is restricted by the height of the transmission protruding above the tracks themselves. Alternatively, the transmission may be located within the track. Such an implementation, however, requires an enlarged track cross section which significantly adds to the height thereof. The minimum profile defined by a seat adjusted to minimum vertical elevation is restricted by the height of the enlarged track. Therefore, there is a need to provide vertical height adjustment as well as fore-aft seat positioning mechanisms which will provide a minimum profile to permit use of a low profile seat.

SUMMARY OF THE PRESENT INVENTION

The present invention incorporates a mechanism used to control the vertical height as well as fore-aft position of a vehicle seat while presenting a minimum height profile when adjusted to minimum vertical elevation. The seat is connected to a pair of rails, one stationary and one reciprocable. A seat is affixed to an attachment bracket which is connected to the reciprocable rail by a vertical height adjuster comprising a vertically oriented screw jack which may be positioned to selectable heights by a motor. The fore-aft relationship of the rails may also be selectively adjusted by a motor driving a horizontally oriented screw jack. Both screw jacks incorporate a screw connected to a helical gear engaged to a worm gear. The worm gear is driven by a remote motor through a flexible drive cable. Both screw jacks present a structure which offers a minimum height profile when the seat is positioned at minimum vertical height. In this manner, an aerodynamically efficient roof line may be utilized while providing maximum head room for the vehicle occupants.

The preferred embodiment of the present invention includes a low vertical profile seat height adjustment mechanism to be used to provide selectable vertical height adjustment of a vehicle seat with respect to a base comprising a first housing defining a first bore and a portion of a second bore. A second housing having a structural interfitting relationship with the first housing defines a cavity therebetween. The second housing further defines a bore axially displaced from and coaxial to the first bore and a portion of a bore alignable with the portion of the second bore of the first housing so as to define a second bore. The first and second bore define axes which are radially displaced and orthogonally oriented with respect to one another. The second housing further includes a radially extending portion disposed about the bore axially displaced from and coaxial to the first bore thereby forming a first annular face. A helical gear is located within the cavity defined between the first and second housing. The gear includes a first diameter axially extending circumferential portion including teeth formed therein. The gear includes opposed second smaller diameter axially extending circumferential portions defining respective bearing surfaces. The second smaller diameter bearing surfaces of the helical gear are located in the first bore and the bore axially displaced from and coaxial to the first bore to provide radial bearing support for the helical gear. The gear includes a radially extending surface defining a second annular face which is located between respective first and second diameter portions of the helical gear which act in conjunction with the first annular face to provide an axial bearing support for the helical gear. A worm gear having first and second opposed end portions forming cylindrical coaxial bearing surfaces and an intermediate portion having a worm thread formed therein is bearingly supported in the second bore so as to provide alignment of the worm thread with the teeth of the helical gear. The first and second housing are maintained in the structurally interfitting relationship therebetween and secured to a base by fasteners. A vertically extending screw drivingly engaged with the helical gear and threadably engaged to a nut affixed to the seat and threadably engaged to the screw completes the present invention.

The preferred of the present invention further includes a nut affixed to the seat by structural interference with a channel member affixed to the seat. The nut is maintained in constant contact with the channel member by use of structurally opposed fulcrums equidistantly located from a central axis of rotation extending through the nut and orthogonal to the screw. Further, the helical gear of the present invention preferably includes a centrally disposed blind ended bore having a pair of structurally discrete objects maintaining a point contact between each discrete object as well as a point contact with the base and the blind ended bore. The discrete object may be spherical members.

These and other aspects of the present invention will become more readily apparent by reference to the following detailed description of the embodiments as shown in the drawings.

BRIEF DESCRIPTION OF THE DRAWINGS

FIG. 5 is a cross-section of the horizontal seat position adjuster;

FIG. 6 is an exploded view of the horizontal seat position adjuster;

FIG. 7 is a side-view of the vertical seat position adjuster nut;

FIG. 8 is a top view of the vertical seat position adjuster nut; and

DETAILED DESCRIPTION OF THE PREFERRED EMBODIMENT

Figure 3:
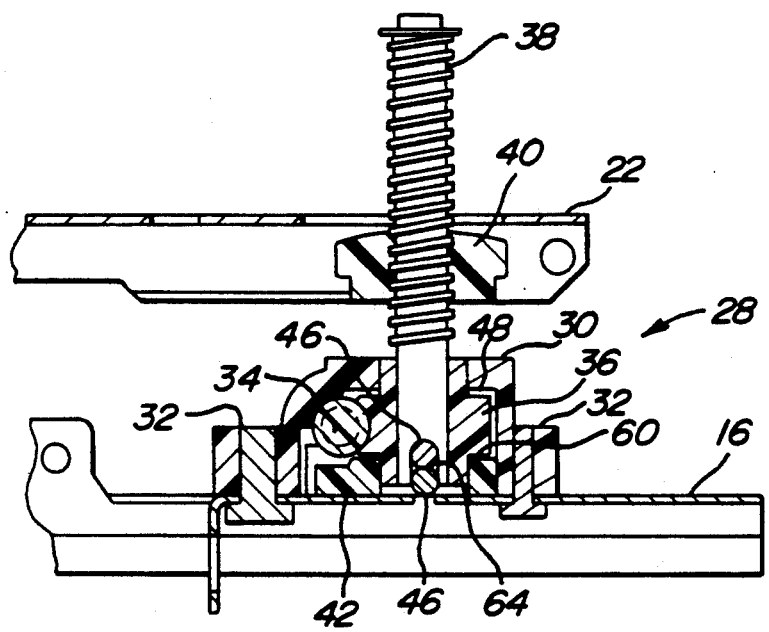
FIG. 3 is a cross-section of the vertical seat position adjuster.
Figure 4:
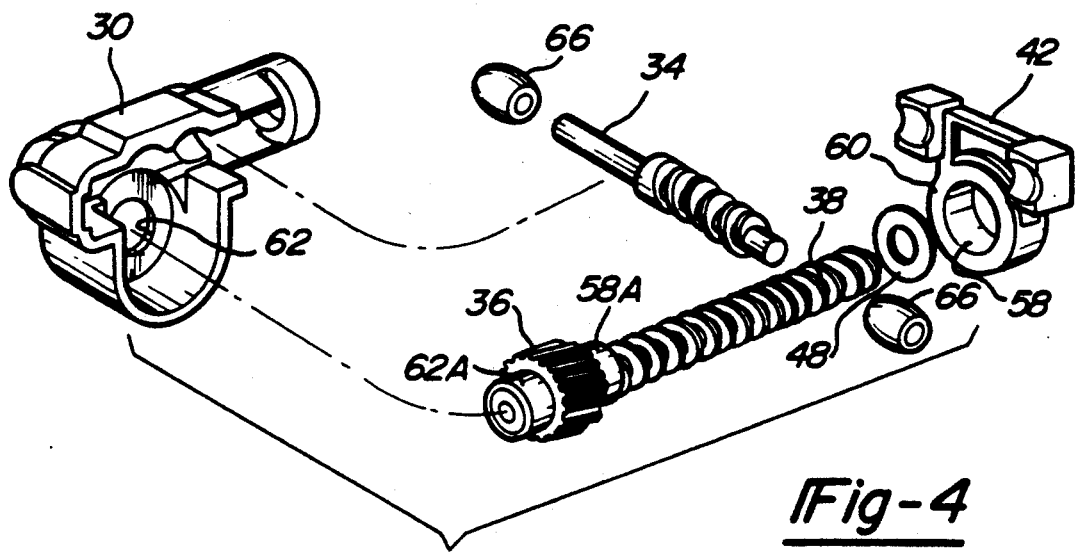
FIG. 4 is an exploded view of the vertical seat position adjuster.

The preferred embodiment of the present invention, as shown in FIGS. 1 through 9 is utilized in conjunction with an adjustably mounted automotive vehicle passenger seat 10 located within the passenger compartment of a vehicle upon floor pan 12. The seat adjuster mechanism 14 includes slidably interfitted, elongated channels; an upper one being designated as 16, and a lower one designated as 18. Lower seat channel 18 is maintained stationary by mounting brackets 20, 20 connected to floor pan 12. Seat adjuster mechanism 14 further includes seat attachment bracket 22 and lateral interconnecting link 24. Vertical height adjusters 28, 28 are located at each of the four corners of seat 10. Vertical height adjusters 28 are utilized to control the elevation of seat 10. Vertical height adjusters 28, as shown in FIGS. 3 and 4, include a housing 30 which may be affixed to upper seat channel 16 by fasteners 32, 32. A worm gear 34 carried by spherical bearings 66, 66 is utilized to drive helical gear 36 to accomplish rotation of screw 38. As may be seen in FIG. 8, nut 40 is retained in seat attachment bracket 22 and prevented from rotation about axis 56 of screw 38 by the structural interrelationship between side portions 52, 52 and seat attachment bracket 22. Housing base plate 42 structurally fits within housing 30 to define a cavity therebetween. Bores 58 and 62 interact with respective surfaces contiguous with helical gear 36 to facilitate proper radial alignment of screw 38 upon rotation thereof. Axial loading transmitted into screw 38 is imparted through helical gear 36 into annular surface 60 of housing base plate 42. Hardened steel balls 46, 46, positioned within bore 64 defined in helical gear 36, facilitate a low resistance rotational bearing for vertical height adjuster 28. Beveled washer 48 provides an axial compliance to the assembly to maintain a compliantly rigid assembly. Nut 40, as shown in FIGS. 7 and 8, is contained within seat attachment bracket 22 and maintains contact therewith at four locations; fulcrum points 50, 50 as well as sides 52, 52. The structural interrelationship of seat attachment bracket 22 and nut 40 is such that nut 40 will be retained in seat attachment bracket 22 in such a manner that it may rotate about axis 54 while maintaining continuous contact at points 50, 50 with seat attachment bracket 22. In addition, nut 40 will be restrained from rotation about axis 56 by structural interference between portions 52, 52 and seat attachment bracket 22. In this manner any rotation of screw 38 will result in a change in vertical height of seat 10.

Figure 1:
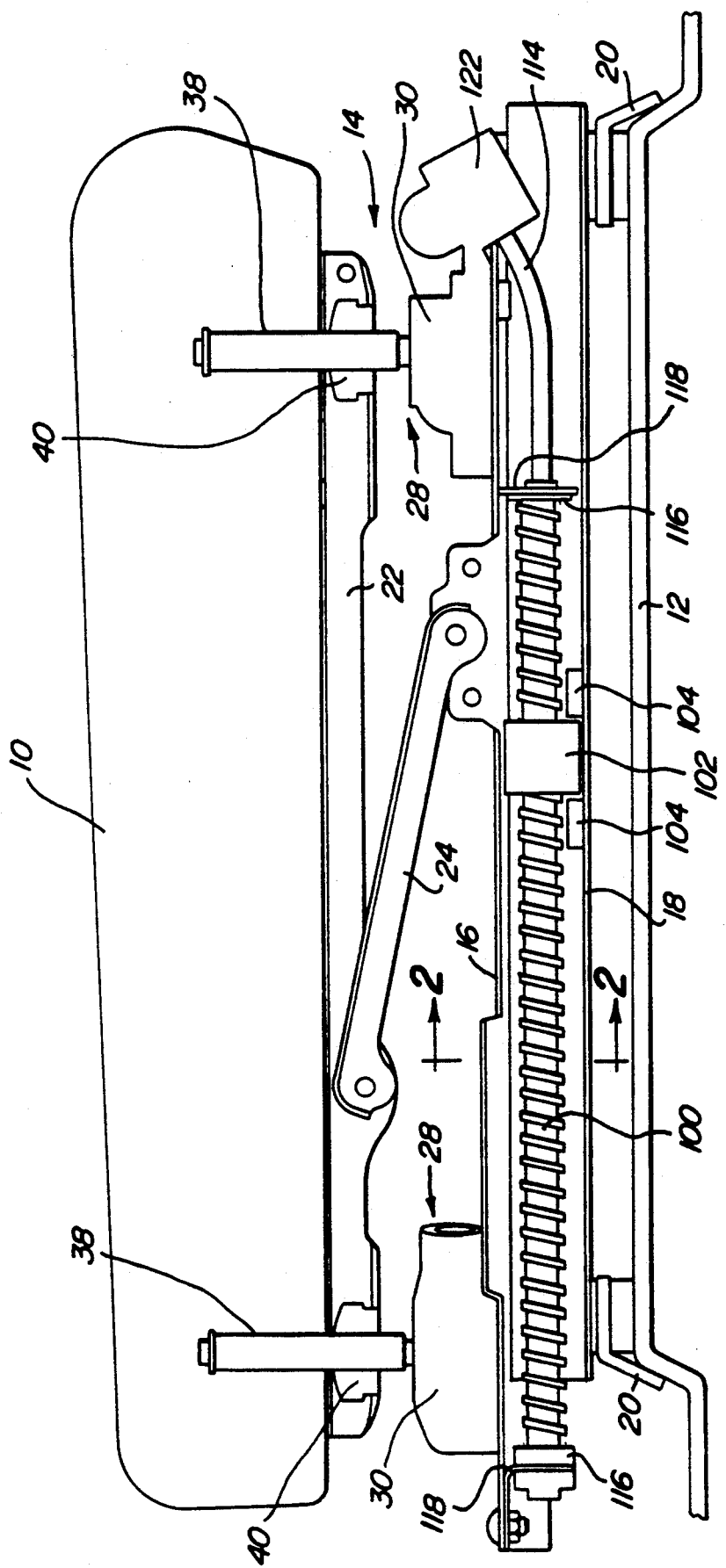
FIG. 1 is a cross-sectional view of the entire seat position adjuster.
Figure 2:
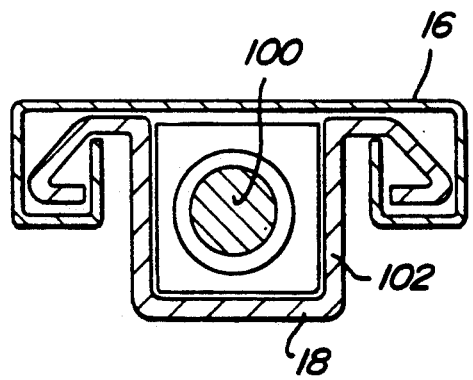
FIG. 2 is a cross-sectional view taken at line 2—2 of FIG. 1.
Figure 9:
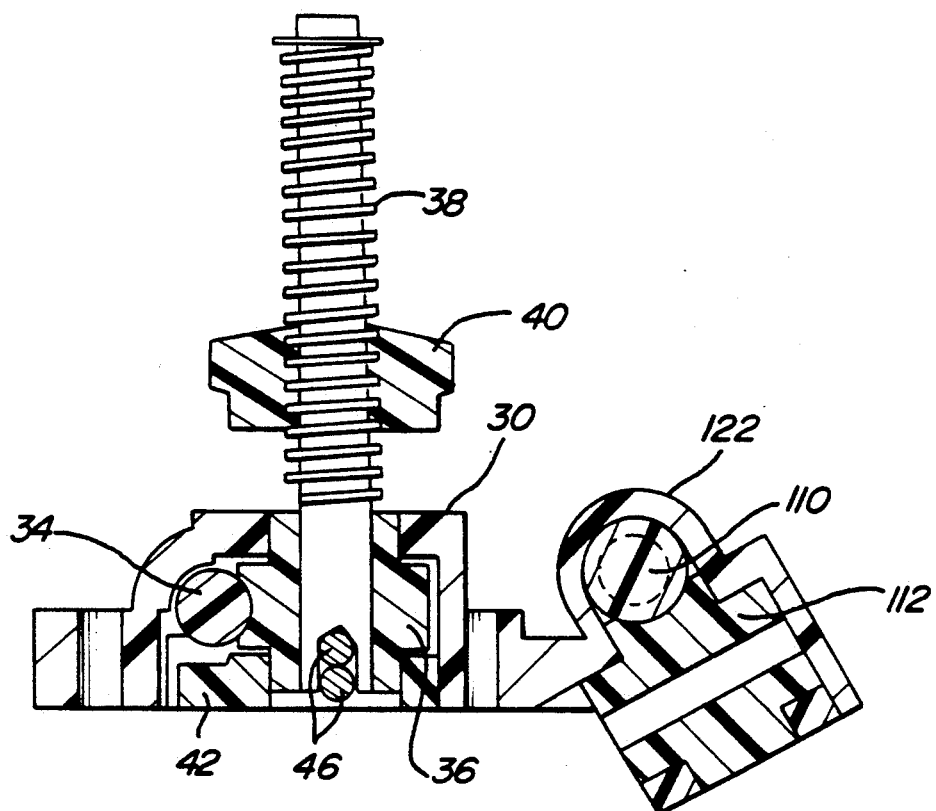
FIG. 9 is a cross-section of the modular vertical and horizontal seat position adjuster.

As shown in FIGS. 1, 5 and 6, the horizontal position of seat 10 is controlled by translating upper seat channel 16 with respect to lower seat channel 18 by rotating screw 100 while maintaining drive nut 102 stationary. Retention tabs 104, 104 define a fore-aft stationary position for nut 102 whereas the structural interrelationship between lower seat channel 18 and nut 102 prevent rotation of nut 102 about the axis of screw 100. As shown in FIG. 5, motor 106 drives a first flexible cable 108 which causes worm gear 110 engaged with helical gear 112 to rotate. Worm gear 110 is carried by two spherical bearings 120 in housing 122. Housing 122 defines recesses 124, 124 and half-bore 126 which cooperate with respective recesses defined in housing closure cap 128 to facilitate bearing support and engagement between helical gear 112 and worm gear 110. Flexible cable 114 transmits rotary motion to screw 100 causing same to rotate about stationary nut 102 producing a translation of screw 100. Upper seat channel 16 is connected to screw 100 at opposing ends through bearings 116, 116 which engage brackets 118, 118 connected thereto. In this manner, remotely located motor 106 may produce fore-aft translation of seat 10 to provide selectively adjustable position thereof. Jack housing 30 and housing 122 may be structurally interconnected, as shown in FIG. 9, to provide a modular assembly that presents a consolidation of mounting tabs and associated fasteners requiring minimal package space and substantial weight savings.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A low vertical profile vertical seat height adjustment mechanism to be used to provide selectable vertical height adjustment of a vehicle seat with respect to a base, comprising;

a housing defining a cavity;

a horizontally oriented worm gear disposed in said cavity;

a vertically oriented helical gear disposed in said cavity and maintained meshingly engaged to said worm gear;

a vertically extending member having a circumferentially extending thread defined thereon drivingly connected to said helical gear;

said member threadingly engaging cooperating threads defined in a bore defined in a nut affixed to said seat facilitating a translatable relationship between said member and said nut upon rotation of said helical gear; and said vehicle seat including a seat attachment bracket including a channel member having a central opening and said nut is disposed in said central opening and defines a slidably interfitting relationship therewith which restrains rotation of said nut about said bore.

* * * * *